United States Patent
Iwata et al.

(10) Patent No.: US 11,940,281 B2
(45) Date of Patent: Mar. 26, 2024

(54) LEARNING APPARATUS, ESTIMATION APPARATUS, LEARNING METHOD, ESTIMATION METHOD, AND PROGRAM

(71) Applicant: NIPPON TELEGRAPH AND TELEPHONE CORPORATION, Tokyo (JP)

(72) Inventors: Tomoharu Iwata, Tokyo (JP); Hitoshi Shimizu, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 260 days.

(21) Appl. No.: 17/433,397

(22) PCT Filed: Feb. 12, 2020

(86) PCT No.: PCT/JP2020/005315
§ 371 (c)(1),
(2) Date: Aug. 24, 2021

(87) PCT Pub. No.: WO2020/175140
PCT Pub. Date: Sep. 3, 2020

(65) Prior Publication Data
US 2022/0146270 A1 May 12, 2022

(30) Foreign Application Priority Data
Feb. 27, 2019 (JP) ................................ 2019-034024

(51) Int. Cl.
*G01C 21/34* (2006.01)
*G06N 20/00* (2019.01)

(52) U.S. Cl.
CPC ......... *G01C 21/3423* (2013.01); *G06N 20/00* (2019.01)

(58) Field of Classification Search
CPC .... G01C 21/3423; G06N 20/00; G06Q 10/04; G08G 1/0129
See application file for complete search history.

(56) References Cited

U.S. PATENT DOCUMENTS

2019/0012547 A1* 1/2019 Togashi .................. H04N 7/18
2020/0051430 A1* 2/2020 Vrati ..................... G08G 1/0145

OTHER PUBLICATIONS

Shimizu et al. (2018) "Improving route traffic estimation by considering staying population" PRIMA 2018: Principles and Practice of Multi-Agent Systems.
Li et al. (2018) "Diffusion Convolutional Recurrent Neural Network:Data-Driven Traffic Forecasting" ICLR, Apr. 30, 2018.

* cited by examiner

*Primary Examiner* — Peter D Nolan
*Assistant Examiner* — Anwar Mohamed

(57) ABSTRACT

A learning apparatus includes an input unit configured to input route information indicating a route including one or more paths of a plurality of paths and moving body number information indicating the number of moving bodies for a date and a time on a path to be observed among the plurality of paths, and a learning unit configured to learn a parameter of a model indicating a relationship between the number of moving bodies for each of the plurality of paths and the number of moving bodies for the route and a relationship between the numbers of moving bodies for the route at different dates and times by using the route information and the moving body number information.

10 Claims, 4 Drawing Sheets

LEARNING APPARATUS, ESTIMATION APPARATUS, LEARNING METHOD, ESTIMATION METHOD, AND PROGRAM

CROSS-REFERENCE TO RELATED APPLICATIONS

This application is a U.S. 371 Application of International Patent Application No. PCT/JP2020/005315, filed on 12 Feb. 2020, which application claims priority to and the benefit of JP Application No. 2019-034024, filed on 27 Feb. 2019, the disclosures of which are hereby incorporated herein by reference in their entireties.

TECHNICAL FIELD

The present disclosure relates to a learning apparatus, an estimation apparatus, a learning method, an estimation method, and a program.

BACKGROUND ART

Obtaining a grasp on the congestion situation of a road from the viewpoint of safety, convenience, and the like is important. For this reason, it has been conventional practice to grasp the congestion situation of a road by arranging sensors and people on the road; however, arranging sensors and people on many roads entails considerable costs.

In contrast, a technique for grasping the congestion situation of a road by using a tomographic model has been proposed (for example, see Non Patent Literature 1). A technique for estimating future traffic has also been proposed (see, for example, Non Patent Literature 2).

CITATION LIST

Non Patent Literature

Non-Patent Literature 1: Hitoshi Shimizu, Tatsushi Matsubayashi, Yusuke Tanaka, Tomoharu Iwata, Naonori Ueda, Hiroshi Sawada, "Improving Route Traffic Estimation by Considering Staying Population", PRIMA, 2018
Non-Patent Literature 2: Yaguang Li, Rose Yu, Cyrus Shahabi, Yan Liu, "Diffusion Convolutional Recurrent Neural Network. Data-Driven Traffic Forecasting", ICLR, 2018

SUMMARY OF THE INVENTION

Technical Problem

However, in the tomographic model, the current number of people can be estimated, but there is a problem that the future number of people cannot be estimated. In the technique for estimating future traffic, route information may not be used, and thus, there is a problem that the estimation accuracy of the number of people on an unobserved road is low.

The present disclosure has been made in view of the aforementioned problems, and an object of the present disclosure is to estimate the future number of moving bodies for a path and the future number of moving bodies for a route with high accuracy.

Means for Solving the Problem

From the viewpoint of achieving such an object, according to an embodiment of the present disclosure, there is provided a learning apparatus that includes an input unit configured to input route information indicating a route including one or more paths of a plurality of paths and moving body number information indicating the number of moving bodies for a date and a time on a path to be observed among the plurality of paths, and a learning unit configured to learn a parameter of a model indicating a relationship between the number of moving bodies for each of the plurality of paths and the number of moving bodies for the route and a relationship between the numbers of moving bodies for the route at different dates and times by using the route information and the moving body number information.

According to another embodiment of the present disclosure, there is provided a learning apparatus that includes an input unit configured to input route information indicating a route including one or more paths of a plurality of paths and a parameter of a learned model indicating a relationship between the number of moving bodies for each of the plurality of paths and the number of moving bodies for the route and a relationship between the numbers of moving bodies for the route at different dates and times, and an estimation unit configured to estimate at least one of the number of moving bodies for each of the plurality of paths at a date and a time to be estimated or the number of moving bodies for the route at the date and time to be estimated by using the route information and the parameter of the learned model.

Effects of the Invention

The future number of moving bodies for a path and the future number of moving bodies for a route may be estimated with high accuracy.

DESCRIPTION OF EMBODIMENTS

Figure 1:
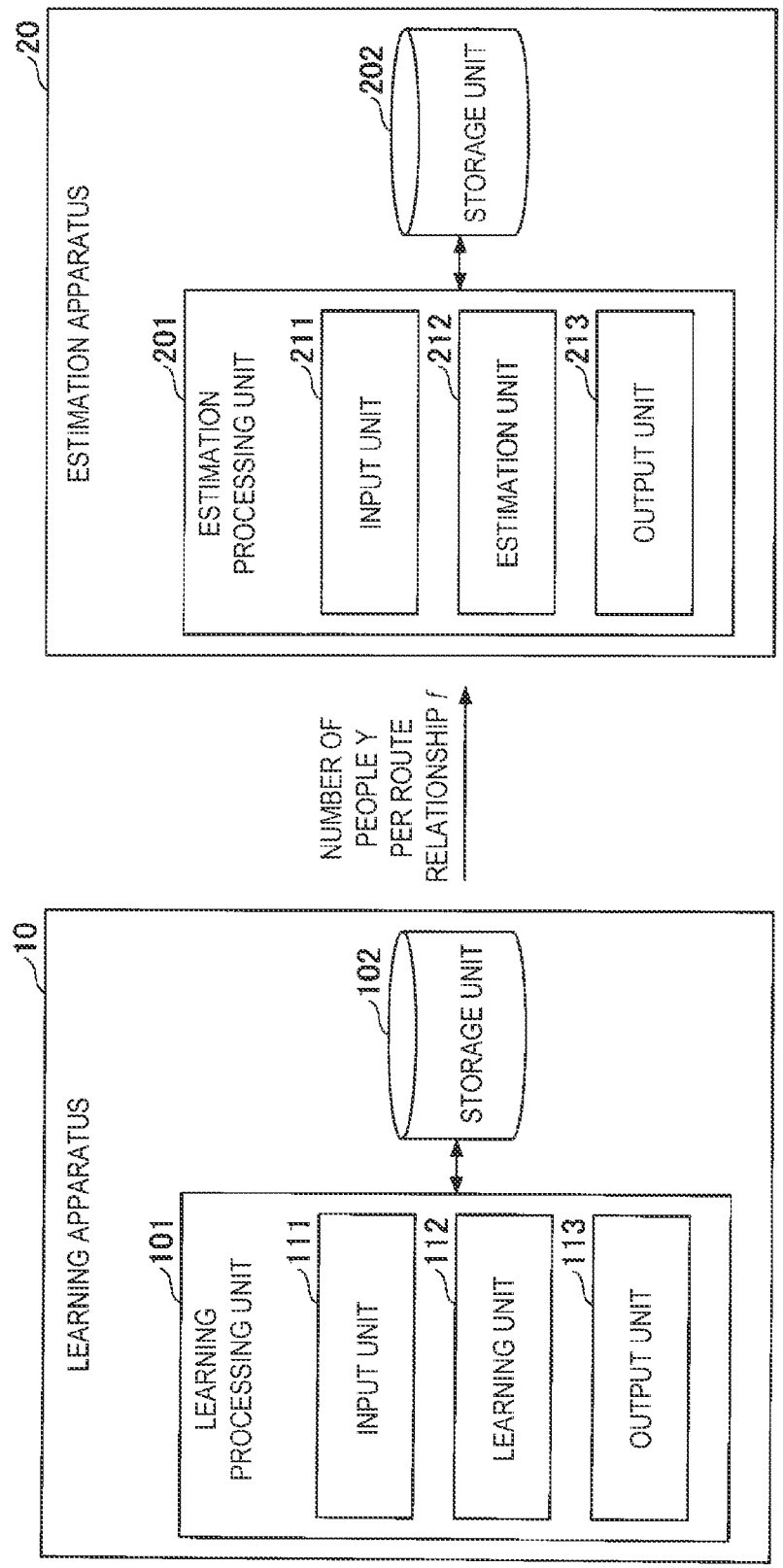
FIG. 1 is a diagram illustrating an example of functional configurations of a learning apparatus and an estimation apparatus according to an embodiment of the present disclosure.

An embodiment of the present disclosure will be described below. In the embodiment of the present disclosure, a case where the number of moving bodies for each of a plurality of paths and the number of moving bodies for each of a plurality of routes are estimated when route information, time series data of the number of moving bodies in some paths, and auxiliary information are given will be described.

Although a case where the moving bodies are pedestrians is described in one example in the embodiment of the present disclosure, the present disclosure is not limited to such an example. The embodiment of the present disclosure may be similarly applied to, for example, any moving body such as a vehicle or a bicycle.

Although a case where the paths are roads is described in one example in the embodiment of the present disclosure, the present disclosure is not limited to such an example. The embodiment of the present disclosure may be similarly applied to, for example, any path such as a passage of an event site or a highway. Furthermore, the embodiment of the present disclosure may be similarly applied to, for example, a case where traffic flowing over a communication network corresponds to the moving bodies and links constituting the communication network correspond to the paths.

As described above, in the embodiment of the present disclosure, it is assumed that the route information, the number of people for each road which is an example of time series data of the number of moving bodies in some paths, and the auxiliary information are given.

Route information A is expressed by an (I×J) matrix indicating a relationship between roads and routes where I is the number of roads and J is the number of routes, and an (i, j) element $a_{ij}$ is 1 when the road i is included in the route j and is 0 when the road i is not included in the route j. Each route is constituted by one or more roads.

The number of people for each road is expressed by the following equation.

$$X_{obs} = \{\{\{x_{dti}\}_{i \in \mathcal{I}_{obs}}\}_{t=1}^{T_d}\}_{d=1}^{D} \qquad [\text{Math. 1}]$$

$X_{obs}$ indicates the number of people passing for each of a plurality of times on an observed road, and $x_{dti}$ indicates the number of people passing through the road i at a time t on a date d.

$$\mathcal{I}_{obs} \qquad [\text{Math. 2}]$$

$L_{obs}$ indicates a set of observed roads (that is, roads to be observed), D indicates the number of dates, and $T_d$ indicates the number of points of time on the date d. Each $x_{dti}$ may be the number of people on the road i at the time t on the date d.

The auxiliary information is expressed by the following equation.

$$S = \{s_d\}_{d=1}^{D} \qquad [\text{Math. 3}]$$

S is information on the date d, and is, for example, information such as the expected number of visitors at an event on the date d, an opening time or a starting time of the event, and a closing time of the event. For example, the auxiliary information may be the day of week on the date d, information indicating whether the date d is a holiday, and the like. The auxiliary information S may be, for example, information on a time, information on a road, information on a route, or the like instead of information on the date d.

In the embodiment of the present disclosure, first, the number of people for each route (hereinafter, also referred to as "the number of people per route", and expressed by the following equation) and a relationship f are learned by using the route information A, the number of people $X_{ob}$ for each roads, and the auxiliary information S.

$$Y = \{\{y_{dt}\}_{t=1}^{T_d}\}_{d=1}^{D} \qquad [\text{Math. 4}]$$

$$y_{dt} = \{y_{dtj}\}_{j=1}^{J} \qquad [\text{Math. 5}]$$

Here, $y_{dt}$ is expressed by the above equation, and $y_{dtj}$ is the number of people on the route j at the time t on the date d. The relationship f is any function that outputs the number of people for each route at the time t on the date d (that is, $y_{dt}$). For example, a neural network or the like may be used as the relationship f.

In the embodiment of the present disclosure, an estimated value of the number of people for each road (hereinafter, also referred to as "the estimated number of people per road", and expressed by the following equation) and an estimated value of the number of people for each route (hereinafter, also referred to as "the estimated number of people per route", and expressed by the following equation) by using the learned number of people Y per route, the learned relationship f, and the auxiliary information S.

$$X_{d*} = \{\{x_{d*ti}\}_{i=1}^{I}\}_{t=1}^{T_{d*}} \qquad [\text{Math. 6}]$$

$$Y_{d*} = \{\{y_{d*tj}\}_{j=1}^{J}\}_{t=1}^{T_{d*}} \qquad [\text{Math. 7}]$$

Here, d* is a date to be estimated, and is, for example, a current date, past date, or future date at which the road is not necessarily observed at all times t on the date d*, or the like. At this time, the auxiliary information S may include $s_{d*}$ corresponding to the date d*. The estimated number of people $X_{d*}$ per road and the estimated number of people $Y_{d*}$ per route at a future time on the current date d* may be estimated. Only one of the estimated number of people $X_{d*}$ per road and the estimated number of people $Y_{d*}$ per route may be estimated.

Functional Configurations of Learning Apparatus 10 and Estimation Apparatus 20

First, functional configurations of a learning apparatus 10 that learns the number of people Y per route and the relationship f and an estimation apparatus 20 that estimates at least one of the estimated number of people $X_{d*}$ per road or the estimated number of people $Y_{d*}$ per route will be described with reference to FIG. 1. FIG. 1 is a diagram illustrating an example of the functional configurations of the learning apparatus 10 and the estimation apparatus 20 according to the embodiment of the present disclosure.

Learning Apparatus 10

As illustrated in FIG. 1, the learning apparatus 10 according to the embodiment of the present disclosure includes a learning processing unit 101, and a storage unit 102.

The learning processing unit 101 learns the number of people Y per route and the relationship f by using the route information A, the number of people $X_{obs}$ for each road, and the auxiliary information S as inputs. At this time, the learning processing unit 101 learns parameters of a model (that is, parameters of the number of people Y per route and the relationship f) in consideration of a relationship between the number of people for each road and the number of people for each route and a relationship between the numbers of people for each route at different dates and times (that is, dates d and times t).

Here, the learning processing unit 101 includes an input unit 111, a learning unit 112, and an output unit 113.

The input unit 111 inputs the route information A, the number of people $X_{obs}$ for each road, and the auxiliary information S. The input unit 111 may input the route information A, the number of people $X_{obs}$ for each road, and the auxiliary information S stored in the storage unit 102, or may receive and input the route information A, the number of people $X_{obs}$ for each road, and the auxiliary information S from another apparatus connected via a communication network. Alternatively, the input unit 111 may input at least one of the route information A, the number of people $X_{obs}$ for each road, or the auxiliary information S from the storage unit 102, and may receive and input the remaining information from another apparatus.

The learning unit 112 learns (the parameters of) the number of people Y per route and the relationship f by using the route information A, the number of people $X_{obs}$ for each road, and the auxiliary information S input by the input unit 111.

Here, a relationship indicated by the following Equation (1) is established between the number of people $x_{dti}$ passing through the road i at the time t on the date d and the number of people $y_{dtj}$ on the route j at the time t on the date d.

[Math. 8]

$$x_{dti} \approx \sum_{j=1}^{J} a_{ij} y_{dtj} \quad (1)$$

The above Equation (1) indicates that the number of people passing through a certain road may be approximated by the total number of people on a route passing through the road. Instead of the relationship indicated by the above Equation (1), a relationship in consideration of a time during which people move on the route may be used, or a relationship in which a movement time changes depending on congestion may be used.

It is assumed that the number of people $y_{dt}$ for each route at the time t on the date d may be estimated from the auxiliary information $s_d$ of the date d, the numbers of people $y_{d, t-1}, y_{d, t-2}, \ldots$ for each route at an earlier time, and the like. That is, the number of people $y_{dt}$ for each route at the time t on the date d may be estimated (approximated) by the following Equation (2).

[Math. 9]

$$y_{dt} \approx f(t, s_d, y_{d,t-1}, y_{d,t-2}, \ldots) \quad (2)$$

Here, as described above, the relationship f is any function that outputs the number of people $y_{dt}$ for each route at the time t on the date d, and, for example, a neural network or the like is used.

When the number of people $y_{dt}$ for each route at the time t on the future date d is estimated, the following Equation (3) is used instead of the above Equation (2).

[Math. 10]

$$y_{dt} \approx f(t, s_d) \quad (3)$$

That is, the relationship f that does not use, as inputs, the numbers of people $y_{d, t-1}, y_{d, t-2}, \ldots$ for each route at a time earlier than the time t, and the like is used.

A relationship between the numbers of people for each route at different times is used in the above Equation (2) and Equation (3); however, for example, a relationship between the numbers of people for each road at different dates and times may be used.

When the number of people $X_{obs}$ for each road (and the auxiliary information S) is given, the learning unit 112 learns (the parameters of) the number of people Y per route and the relationship f to satisfy the relationships indicated by the above Equation (1) and the relationship indicated by the above Equation (2) (or Equation (3)). For example, the learning unit 112 learns the number of people Y per route and the relationship f by any optimization technique to minimize an error E indicated by the following Equation (4).

[Math. 11]

$$E = \sum_{d=1}^{D} \sum_{t=1}^{T_d} \sum_{i \in I_{obs}} \left( x_{dti} - \sum_{j=1}^{J} a_{ij} y_{dtj} \right)^2 + \quad (4)$$

$$\lambda \sum_{d=1}^{D} \sum_{t=1}^{T_d} \| y_{dt} - f(t, s_d, t, y_{d,t-1}, y_{d,t-2}, \ldots) \|^2$$

Here, $\lambda > 0$ is a hyperparameter. In a second term in the above Equation (4), an error of an estimated value of the number of people $y_{dt}$ f for each route at the next time (that is, an error with an estimated value f(t, $s_d$, $y_{d, t-1}$, $y_{d, t-2}$, ...) at the time t using $y_{d, t-1}$, $y_{d, t-2}$, ..., or the like until a time t-1) is used; however, for example, an error of an estimated value estimated on a long-term basis may be used when long-term prediction is desired. For example, maximum likelihood estimation, Bayes estimation, or the like may be used instead of minimizing a squared error.

The output unit 113 outputs the number of people Y per route and the relationship f learned by the learning unit 112 (that is, (the parameters of) the learned number of people Y per route and the learned relationship f). The output unit 113 may output (store) the learned number of people Y per route and the learned relationship f to (in) the storage unit 102, or may output the learned number of people Y per route and the learned relationship f to another apparatus (for example, the estimation apparatus 20) connected via a communication network.

Estimation Apparatus 20

As illustrated in FIG. 1, the estimation apparatus 20 according to the embodiment of the present disclosure includes an estimation processing unit 201, and a storage unit 202.

The estimation processing unit 201 estimates the estimated number of people $X_{d*}$ per road and the estimated number of people $Y_{d*}$ for each route by using the learned model (that is, the learned number of people Y per route and the learned relationship f) and the auxiliary information S as inputs.

Here, the estimation processing unit 201 includes an input unit 211, an estimation unit 212, and an output unit 213.

The input unit 211 inputs (parameters of) the learned number of people Y per route and the learned relationship f, the route information A. and the auxiliary information S. The input unit 211 may input the learned number of people Y per route, the learned relationship f, the route information A, and the auxiliary information S stored in the storage unit 202, or may receive and input the learned number of people Y per route, the learned relationship f, the route information A, and the auxiliary information S from another apparatus (for example, the learning apparatus 10) connected via a communication network. Alternatively, the input unit 211 may input at least one of the learned number of people Y per route, the learned relationship f, the route information A, or the auxiliary information S from the storage unit 202, and may receive and input the remaining information from another apparatus.

The estimation unit 212 estimates the estimated number of people $X_{d*}$ per road and the estimated number of people $Y_{d*}$ per route by using the learned number of people Y per route, the learned relationship f, the route information A, and the auxiliary information S input by the input unit 211.

The estimation unit 212 estimates the number of people $y_{dt}$ for each route at the next time t from the following Equation (5) when, for example, a current time is t-1 and a date to be estimated is d=d*.

[Math. 12]

$$y_{dt} = f(t, s_d, y_{d,t-1}, y_{d,t-2}, \ldots) \quad (5)$$

When long-term prediction is performed, the estimated number of people $y_{dt}$ may also be substituted into the relationship equation f indicated by the above Equation (5).

When the number of people $y_{dt}$ for each route at the time t on the date d=d* at which the road is observed for all the times is estimated (for example, when the date d=d* is a future date), the estimation unit 212 estimates the number of people $y_{dt}$ from the following Equation (6).

[Math. 13]

$$Y_{dt} = f(t, s_d) \quad (6)$$

That is, the relationship f that does not use, as inputs, the number of people $y_{d, t-1}, y_{d, t-2}, \ldots$ for each route at a time earlier than the time t to be estimated, and the like is used.

The estimation unit 212 estimates the estimated number of people $X_{d*}$ per road from, for example, the following Equation (7).

[Math. 14]

$$X_{dt} = A y_{dt} \quad (7)$$

That is, the estimated number of people $X_{d*}$ per road may be estimated by using (the estimated value of) the number of people $y_{dt}$ for each route and the route information A.

The output unit 213 outputs the estimated number of people $X_{d*}$ per road and the estimated number of people $Y_{d*}$ per route estimated by the estimation unit 212. The output unit 213 may output (store) the estimated number of people $X_{d*}$ per road and the estimated number of people $Y_{d*}$ per route to (in) the storage unit 202, or may output the estimated number of people $X_{d*}$ per road and the estimated number of people $Y_{d*}$ per route to another apparatus connected via a communication network.

Here, although it has been described in the embodiment of the present disclosure that the learning apparatus 10 and the estimation apparatus 20 are different apparatuses, the learning apparatus 10 and the estimation apparatus 20 may be realized as a single apparatus. In this case, the apparatus may include the learning processing unit 101, the estimation processing unit 201, and a storage unit.

Hardware Configurations of Learning Apparatus 10 and Estimation Apparatus 20

Figure 2:
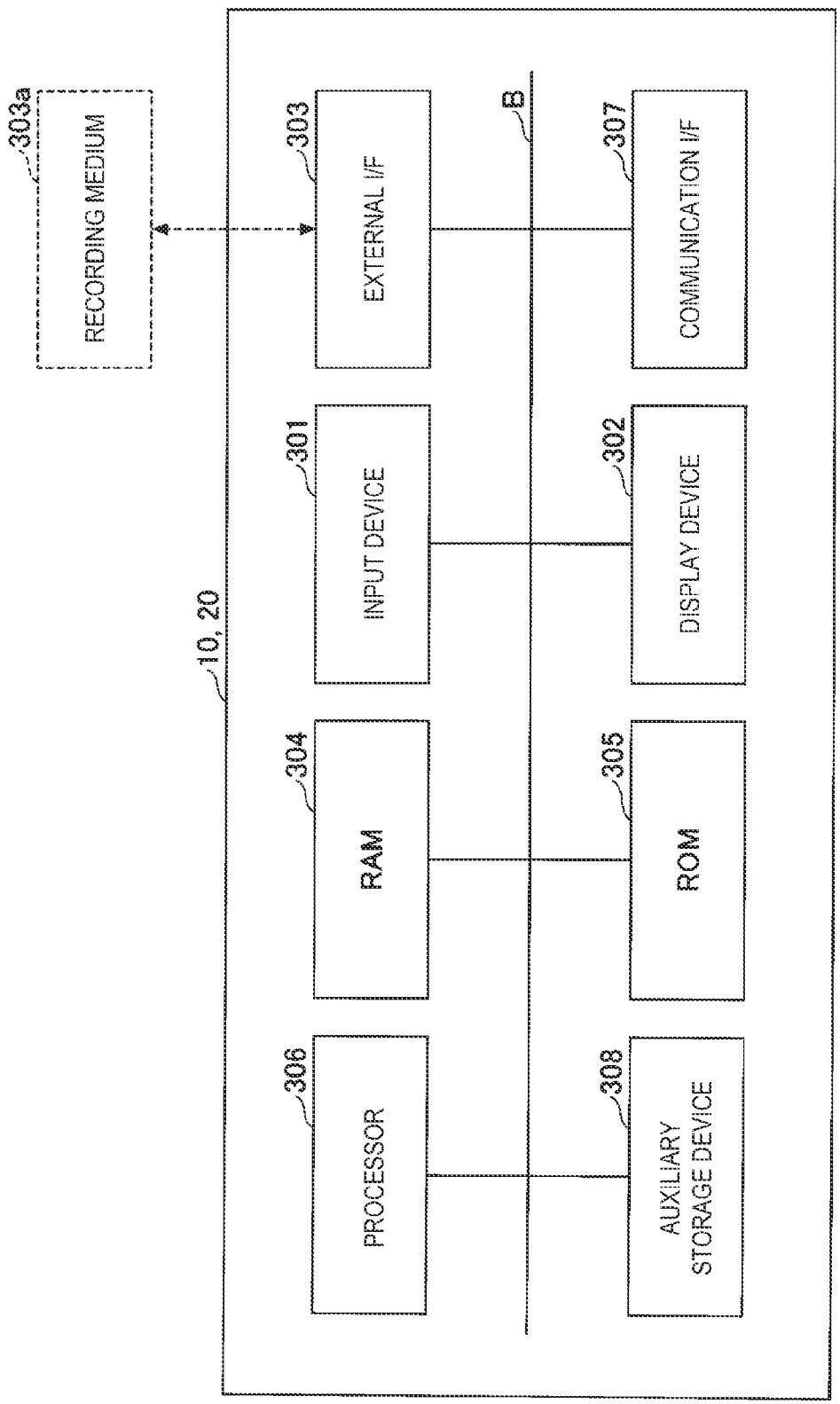
FIG. 2 is a diagram illustrating an example of a hardware configuration of the learning apparatus and the estimation apparatus according to the embodiment of the present disclosure.

Next, hardware configurations of the learning apparatus 10 and the estimation apparatus 20 according to the embodiment of the present disclosure will be described with reference to FIG. 2. FIG. 2 is a diagram illustrating an example of a hardware configuration of the learning apparatus 10 and the estimation apparatus 20 according to the embodiment of the present disclosure. The learning apparatus 10 and the estimation apparatus 20 may be realized with a similar hardware configuration, and thus, hereinafter, the hardware configuration of the learning apparatus 10 will be mainly described.

As illustrated in FIG. 2, the learning apparatus 10 according to the embodiment of the present disclosure includes an input device 301, a display device 302, an external I/F 303, a random access memory (RAM) 304, a read only memory (ROM) 305, a processor 306, a communication I/F 307, and an auxiliary storage device 308. Each of the pieces of hardware is communicably connected via a bus B.

The input device 301 is, for example, a keyboard, a mouse, a touch panel, or the like, and is used by the user to input various operations. The display device 302 is, for example, a display or the like, and displays the processing result of the learning apparatus 10, or the like. The learning apparatus 10 and the estimation apparatus 20 may not include at least one of the input device 301 or the display device 302.

The external I/F 303 is an interface with an external apparatus. The external apparatus includes a recording medium 303a, or the like. The learning apparatus 10 may read and write on the recording medium 303a, or the like via the external I/F 303. For example, one or more programs for realizing the learning processing unit 101, one or more programs for realizing the estimation processing unit 201, or the like may be recorded on the recording medium 303a.

The recording medium 303a includes, for example, a floppy disk, a compact disc (CD), a digital versatile disc (DVD), a secure digital memory card (SD memory card), a universal serial bus (USB) memory card, or the like.

The RAM 304 is a volatile semiconductor memory that temporarily retains a program and data. The ROM 305 is a non-volatile semiconductor memory that can retain a program and data even when the power is turned off. The ROM 305 stores, for example, setting information related to an operating system (OS), setting information related to a communication network, or the like.

The processor 306 is, for example, a central processing unit (CPU), a graphics processing unit (GPU), or the like, and is an operation apparatus that reads a program or data from the ROM 305, the auxiliary storage device 308, or the like onto the RAM 304 to execute processing. The learning processing unit 101 is realized by reading one or more programs stored in the ROM 305, the auxiliary storage device 308, or the like onto the RAM 304, and executing processing by the processor 306. Similarly, the estimation processing unit 201 is realized by reading one or more programs stored in the ROM 305, the auxiliary storage device 308, or the like onto the RAM 304, and executing processing by the processor 306.

The communication I/F 307 is an interface for connecting the learning apparatus 10 to a communication network. One or more programs that realize the learning processing unit 101 and one or more programs that realize the estimation processing unit 201 may be acquired (downloaded) from a predetermined server apparatus or the like via the communication I/F 307.

The auxiliary storage device 308 is, for example, a hard disk drive (HDD), a solid state drive (SSD), or the like, and is a non-volatile storage apparatus that stores a program and data. The program and data stored in the auxiliary storage device 308 include, for example, an OS, an application program that implements various functions on the OS, and the like. The auxiliary storage device 308 of the learning apparatus 10 stores one or more programs that realize the learning processing unit 101. Similarly, one or more programs that realize the estimation processing unit 201 are stored in the auxiliary storage device 308 of the estimation apparatus 20.

The storage unit 102 included in the learning apparatus 10 may be realized by using, for example, the auxiliary storage device 308. Similarly, the storage unit 202 included in the estimation apparatus 20 may be realized by using, for example, the auxiliary storage device 308.

The learning apparatus 10 according to the embodiment of the present disclosure has the hardware configuration illustrated in FIG. 2, and thus may realize various kinds of processing to be described below. Similarly, the estimation apparatus 20 according to the embodiment of the present disclosure has the hardware configuration illustrated in FIG. 2, and thus may realize various kinds of processing to be described below.

Although it has been described in the example illustrated in FIG. 2 that the learning apparatus 10 and the estimation apparatus 20 according to the embodiment of the present disclosure are realized by one apparatus (computer), the present disclosure is not limited to such an example. At least one of the learning apparatus 10 or the estimation apparatus 20 according to the embodiment of the present disclosure may be realized by a plurality of apparatuses (computers). Additionally, a plurality of processors 306 and a plurality of memories (the RAM 304 and the ROM 305, the auxiliary storage device 308, or the like) may be included in one apparatus (computer).

Learning Processing

Figure 3:
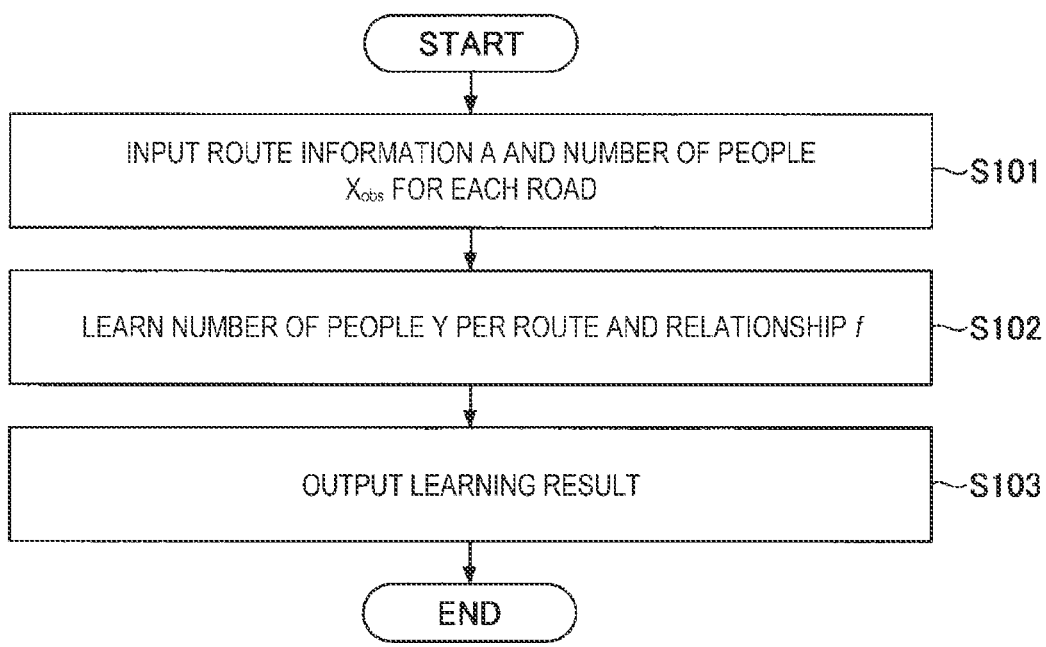
FIG. 3 is a flowchart illustrating an example of learning processing according to the embodiment of the present disclosure.

Next, learning processing (processing of learning the number of people Y per route and the relationship f) according to the embodiment of the present disclosure will be described with reference to FIG. 3. FIG. 3 is a flowchart illustrating an example of the learning processing according to the embodiment of the present disclosure.

First, the input unit 111 inputs the route information A, the number of people $X_{obs}$ for each road, and the auxiliary information S (step S101).

Subsequently, the learning unit 112 optimizes, for example, the above Equation (4) by any optimization technique by using the route information A, the number of people $X_{obs}$ for each road, and the auxiliary information S, and thus learns the number of people Y per route and the relationship f (step S102).

The output unit 113 outputs the learned number of people Y per route and the learned relationship f (step S103). Accordingly, the learned number of people Y per route and the learned relationship f are obtained.

Estimation Processing

Figure 4:
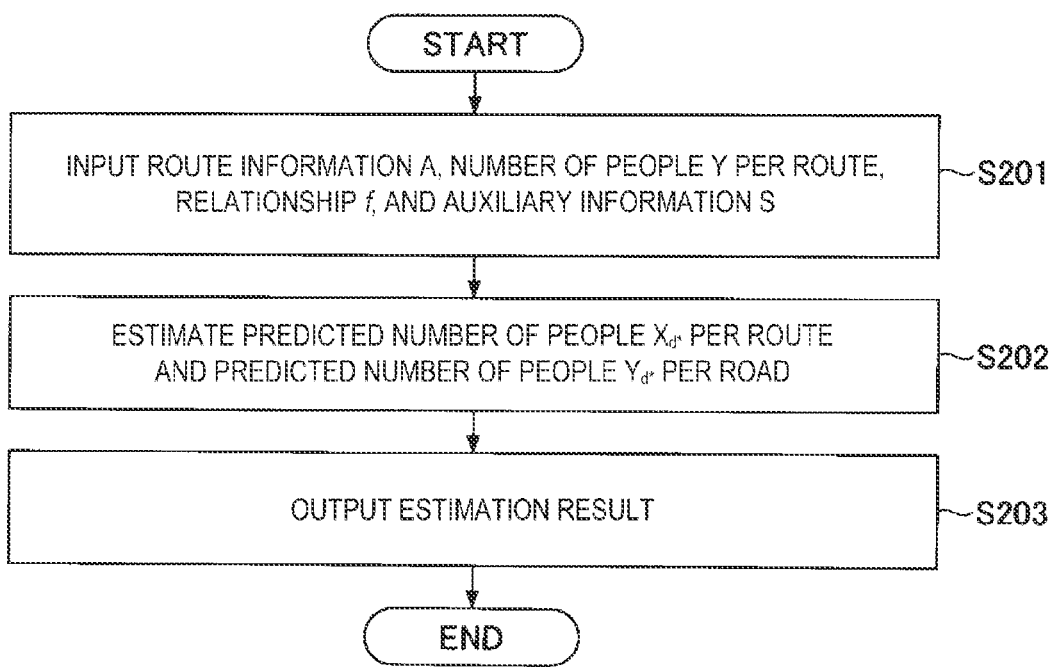
FIG. 4 is a flowchart illustrating an example of estimation processing according to the embodiment of the present disclosure.

Next, estimation processing (processing of estimating the estimated number of people $X_{d*}$ per road and the estimated number of people $Y_{d*}$ per route) according to the embodiment of the present disclosure will be described with reference to FIG. 4. FIG. 4 is a flowchart illustrating an example of the estimation processing according to the embodiment of the present disclosure.

First, the input unit 211 inputs the learned number of people Y per route, the learned relationship f, the route information A, and the auxiliary information S (step S201).

Subsequently, the estimation unit 212 estimates the estimated number of people $Y_{d*}$ per route from the above Equation (5) or Equation (6) and estimates the estimated number of people $X_{d*}$ per road from the above Equation (7) by using the learned number of people Y per route, the learned relationship f, the route information A, and the auxiliary information S (step S202). The estimation unit 212 may estimate only one of the estimated number of people $X_{d*}$ per road or the estimated number of people $Y_{d*}$ per route.

The output unit 213 outputs the estimated number of people $X_{d*}$ per road and the estimated number of people $Y_{d*}$ per route (or any one of the estimated number of people $X_{d*}$ per road and the estimated number of people $Y_{d*}$ per route) (step S203). Accordingly, as the estimation result, at least one of the estimated number of people $X_{d*}$ per road or the estimated number of people $Y_{d*}$ per route is obtained.

Evaluation Result

Finally, as an example, an evaluation result of the estimation result using data when the number of routes in the vicinity of an event site is 80, the number of roads is 227, and the number of observed roads is 37 is illustrated. As the auxiliary information S, the opening time, the starting time, and the closing time of the event, and the expected number of visitors are used. The number of days of learning data is set to 7, the number of days of development data is set to 1, and the number of days of test data is set to 1.

A normalization error E indicated by the following Equation (8) is used as an evaluation criterion.

[Math. 15]

$$E = \frac{\sum_{t=1}^{T_{d*}} \sum_{i \in I_{obs}} |\hat{x}_{d*ti} - x_{d*ti}|}{\sum_{t=1}^{T_{d*}} \sum_{i \in I_{obs}} x_{d*ti}} \quad (8)$$

[Math. 16]

$$\hat{x}_{d*ti}$$

Here, E indicates an estimated value of the number of people passing through the road i at the time t on the date d*, and $x_{d*ti}$ indicates an observed value.

At this time, an error one hour ahead is 0.326. An error when a value at a previous time is used as is for estimation is 0.408, and it may be seen that the estimation error is smaller when the embodiment of the present disclosure is used. The error at an unobserved date (that is, the road is not observed at all times) is 0.455, and it may also be seen that the estimation may be performed with a certain degree of accuracy even at the unobserved date.

The present disclosure is not limited to the disclosure of the above-described embodiment, and various modifications and alterations may be made without departing from the scope of the claims.

REFERENCE SIGNS LIST

10 Learning apparatus
20 Estimation apparatus
101 Learning processing unit
102 Storage unit
111 Input unit
112 Learning unit
113 Output unit
201 Estimation processing unit
202 Storage unit
211 Input unit
212 Estimation unit
213 Output unit

The invention claimed is:

1. A learning apparatus comprising a processor configured to execute operations comprising:
receiving route information of a route and moving body number information as training data, wherein the route information of the route specifies one or more paths in the route, the one or more paths are parts of a plurality of paths, and the moving body number information indicates a number of moving bodies for a date and a time on a path to be observed among the plurality of paths; and training a machine learning model using a set of the route information of the route, the moving body number information of the one or more paths, and date information, wherein the training of the machine learning model comprises updating at least a parameter of a number of moving bodies on the route in the machine learning model, thereby minimizing an error between output of the machine learning model and values of the training data for improving accuracy of the output, the machine learning model determines a first relationship and a second relationship, wherein the first relationship represents a relationship between a number of moving bodies on each path of the plurality of paths and the number of moving bodies on the route, and the second relationship represents a relationship between the numbers of moving bodies on the route at different dates and times;

storing the updated parameter of the machine learning model as a learned machine learning model; and determining, based at least on a different date, the first relationship and the second relationship using the trained machine learning model.

2. The learning apparatus according to claim 1, wherein the machine learning model determines an approximation relationship between the number of moving bodies passing through a path i at a time t on a date d and the total number of moving bodies on a route j including the path i at the time t on the date d, and a function f that uses, as inputs, at least the time t and auxiliary information sd related to the date d and outputs the number of moving bodies for the route j at the time t on the date d.

3. The learning apparatus according to claim 2, wherein the function f further uses, as the input, the number of moving bodies for the route j at a time earlier than the time t.

4. An estimation apparatus comprising a processor configured to execute operations comprising:

receiving route information of a route and moving body number information as input, wherein the route information of the route specifies one or more paths in the route, the one or more paths are parts of a plurality of paths, and a parameter of a learned machine learning model, wherein the learned machine learning model determines a first relationship and a second relationship, the first relationship represents a relationship between the number of moving bodies for each of the plurality of paths and the number of moving bodies for the route, and the second relationship represents a relationship between the numbers of moving bodies for the route at different dates and times; and estimating, using the route information and the parameter of the learned machine learning model, at least one of:
the number of moving bodies for each path of the plurality of paths on a date and a time, or
the number of moving bodies for the route on the date and time.

5. The estimation apparatus according to claim 4, wherein the learned machine learning model indicates an approximation relationship between the number of moving bodies passing through a path i at a time t on a date d and the total number of moving bodies on a route j including the path i at the time t on the date d or the learned machine learning model indicated by a function f that uses, as inputs, at least the time t and auxiliary information sd related to the date d and outputs the number of moving bodies for the route j at the time t of the date d.

6. A method executed by a computer, the method comprising:

receiving route information as training data, wherein the route information indicates a route including one or more paths of a plurality of paths and moving body number information, the moving body number information indicates a number of moving bodies for a date and a time on a path to be observed among the plurality of paths; and training a parameter of a machine learning model using a set of the route information of the route, the moving body number information of the one or more paths, and date information, wherein the training of the machine learning model comprises updating at least a parameter of a number of moving bodies on the route in the machine learning model, thereby minimizing an error between output of the machine learning model and values of the training data for improving accuracy of the output, the machine learning model determines a first relationship and a second relationship, the first relationship represents a relationship between the number of moving bodies on each path of the plurality of paths and the number of moving bodies on the route, and the second relationship represents a relationship between the numbers of moving bodies on the route at different dates and times;

storing the updated parameter of the machine learning model as a learned machine learning model; and determining, using the learned machine learning model with the updated parameter, a number of moving bodies on a path and a number of moving bodies on a route at a future time.

7. The method according to claim 6, the method further comprising:

receiving route information as an input, wherein the route information indicates the route including the one or more paths of the plurality of paths and the parameter of a learned machine learning model, wherein the learned machine learning model determines the first relationship and the second relationship, the first relationship is between the number of moving bodies for each of the plurality of paths and the number of moving bodies for the route, and the second relationship is between the numbers of moving bodies for the route at different dates and times; and estimating, by using the route information and the parameter of the learned machine learning model, at least one of:
the number of moving bodies for each of the plurality of paths at a date and a time to be estimated, or
the number of moving bodies for the route at the date and time to be estimated.

8. The method according to claim 6, wherein
the machine learning model determines an approximation relationship between the number of moving bodies passing through a path i at a time t on a date d and the total number of moving bodies on a route j including the path i at the time t on the date d, and a function f that uses, as inputs, at least the time t and auxiliary information sd related to the date d and outputs the number of moving bodies for the route j at the time t on the date d.

9. The method according to claim 7, wherein
the learned machine learning model is at least one of a learned machine learning model indicating an approximation relationship between the number of moving bodies passing through a path i at a time t on a date d and the total number of moving bodies on a route j including the path i at the time t on the date d or the learned machine learning model indicated by a function f that uses, as inputs, at least the time t and auxiliary information sd related to the date d and outputs the number of moving bodies for the route j at the time t of the date d.

10. The method according to claim 8, wherein
the function f further uses, as the input, the number of moving bodies for the route j at a time earlier than the time t.

* * * * *